W. T. SHAVER.
BOLSTER SPRING FOR VEHICLES.
APPLICATION FILED NOV. 18, 1912.
1,135,213.
Patented Apr. 13, 1915.
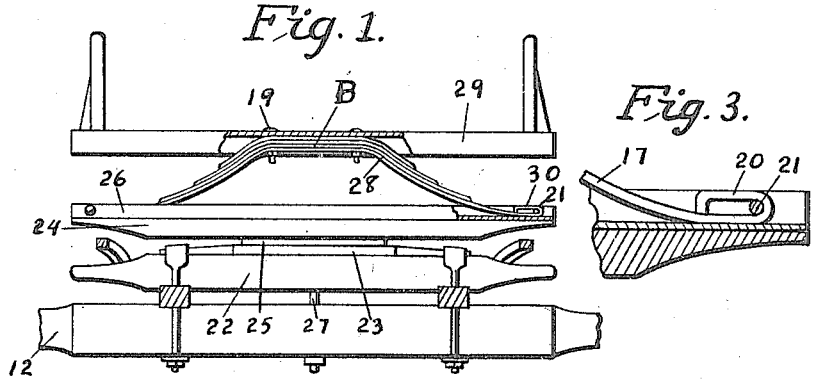
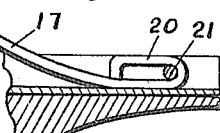
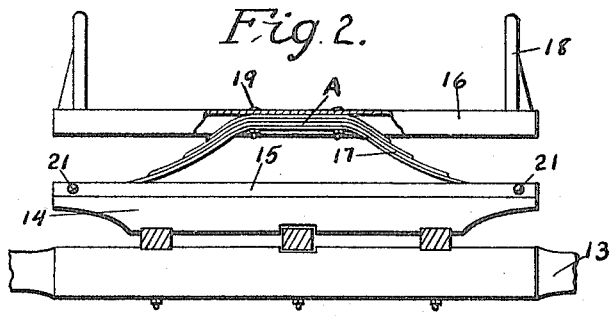
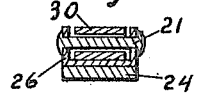
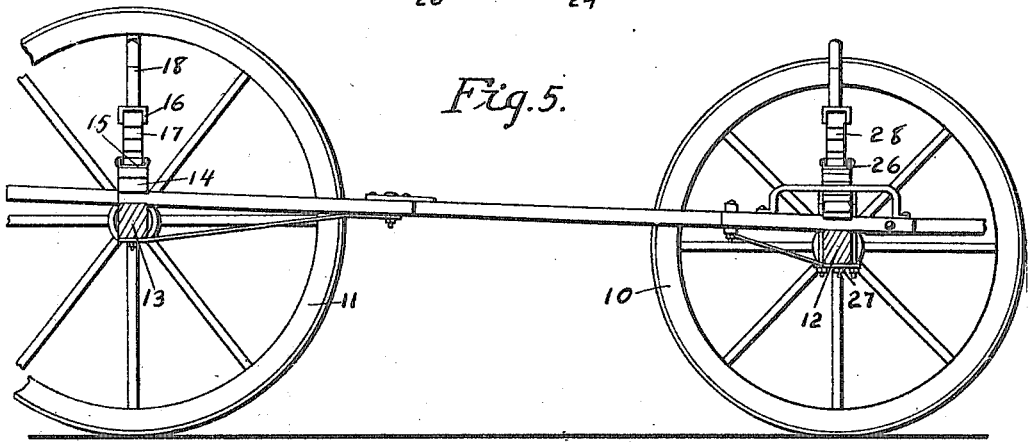
WITNESSES:
L. A. Paley
S. Robinson
INVENTOR.
William T. Shaver
BY
ATTORNEY.

UNITED STATES PATENT OFFICE.

WILLIAM T. SHAVER, OF DES MOINES, IOWA.

BOLSTER-SPRING FOR VEHICLES.

1,135,213.  Specification of Letters Patent.  Patented Apr. 13, 1915.

Application filed November 18, 1912. Serial No. 732,171.

*To all whom it may concern:*

Be it known that I, WILLIAM T. SHAVER, a citizen of the United States, residing at Des Moines, in the county of Polk and State of Iowa, have invented a certain new and useful Bolster-Spring for Vehicles, of which the following is a specification.

The object of my invention is to provide a spring for wagon gears having the general form of a semi-elliptical or bow-spring with the ends extending downwardly and outwardly from the central portion, the central portion being formed with a horizontal portion of considerable length.

A further object is to provide such a spring so arranged that the wagon bed is supported upon a broad base so that the weight of the load will rest on the running gear near the outer ends of the axles rather than at the center thereof.

A further object is to mount such a spring having leaves, in the manner described with the ends slidable, the spring being so arranged that when a heavy load is carried the shorter leaves will carry a larger part of the burden.

A further object is to provide such a spring so arranged as to reduce the tilting of the wagon bed to a minimum, and yet to avoid interference with another part of the gear when such tilting occurs.

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a front elevation of a portion of the wagon gear at the front end of the wagon equipped with a spring embodying my invention. Fig. 2 shows a front elevation of a portion of the wagon gear at the rear end of the wagon equipped with my invention. Figs. 3 and 4 show detail, sectional views of portions of my spring showing the manner in which the ends thereof are mounted, and Fig. 5 shows a vertical, longitudinal sectional view through a wagon gear, my improved springs being shown in side elevation.

In the accompanying drawings, I have used the reference numeral 10 to indicate the front wheels, and the numeral 11 to indicate the rear wheels of a wagon, said wheels being mounted upon axles 12 and 13.

Above the rear axle and above the ordinary parts of the gear at that part of the wagon, is mounted a transverse bar 14, secured to the upper surface of which, I preferably provide a channel bar 15 with its flanges extending upwardly. A bolster or bar 16 is held above the channel bar and spaced apart therefrom by the spring 17 hereinafter more fully described. The bolster 12 preferably consists of a channel bar with its side flanges extending downwardly. At each end of the bolster 16 are bolster posts 18 which may be made of any suitable material, size and shape, to receive between them the bed or box of a wagon.

My improved spring is preferably a leaf spring with the shorter leaves arranged above the longer leaves, as clearly shown in Figs. 1 and 2, and having its ends extended downwardly and outwardly from the central portion A, which is preferably semi-elongated forming a horizontal support which is received within the channel bar bolster 16 and secured thereto by bolts 19 or any other suitable means. By having the portion A of the spring 17 of considerable length, I furnish a broad base for the bolster to rest upon. The ends of the spring are mounted in the channel bar 15 in the following manner: The ends of the lower and longer leaf are bent upwardly and then inwardly to form loops 20, as shown in Figs. 1 and 3. I provide bolts 21 extending through the vertical flanges of the channel bar 15 and through the loops 20 which are designed to slide freely on said bolts.

Mounted above the front axle in the ordinary way is a sand board or bar 22 on the upper surface of which is a smooth plate 23 of ordinary construction. Above the sand-board 22 is a bar 24 on the lower surface of which is a plate 25 designed to move freely on the plate 23. Mounted on the upper side of the bar 24 is a channel bar 26 with its side flanges extending upwardly. Extending through the channel bar 26, the bar 22, the plates 23 and 25, and the axle 12 is a bolt 27. The axle 12 and the bar 22 and the plate 23 are designed to turn on the bolt 27, thus permitting the lateral movement of the wheels. Above the channel bar 26 and held spaced apart therefrom by the spring 28, hereinafter more fully described, is a bolster 29, preferably made of a channel bar with the side flanges extending downwardly. The central portion B of the spring 28, which is similar in form to the spring 17, is received in the central portion of the bolster 29 and is secured thereto by bolts 19 or other suitable means. The outer ends of the lower leaf of the spring 28 are formed into loops 30 which are slidably mounted in the channel bar 26 by means of bolts 21.

The advantages of my improved spring when used in combination with the running gear of a wagon are numerous. The portions A and B furnish broad supports for the bolster and by extending the ends of the springs downwardly and outwardly, the weight of the load is taken away from the center of the axle and placed near the wheels, thereby preventing rocking of the wagon bed and also preventing friction between the bed and bolster posts. Although the tendency in the bed to tilt is reduced to a minimum, the arrangement of my spring at the front end of the wagon is such that if the bed does tilt it cannot interfere with the hounds. The use of the channel bar construction for the bars 29, 16, 26 and 15 gives a maximum of strength with a minimum of weight. The flanges of the channel bars also tend to support, strengthen and aid the springs. By mounting the ends of the springs slidable on the bolts 21, the end of the spring may slide to furnish a perfect adjustment. With the springs arranged in this way, when a heavy load is imposed on the springs, the ends of the lower leaves rest flat on the bottoms of the channel bars 15 and 26, and when the springs are pressed down, the next shorter leaves take part of the weight of the load, thereby greatly adding to the strength of the springs.

I claim as my invention:

1. In a vehicle, the combination with a front axle, of a sand-board mounted thereon, a bar carried above said sand-board, a bolt passing through said members intermediate of their ends, a leaf bow spring having its ends extending downwardly and outwardly from its center and having its outer and lower ends slidably attached to said bar adjacent to the outer ends thereof, and a vehicle body carried on said spring intermediate of its ends, substantially as described.

2. In a vehicle, the combination with an axle, of a sand-board mounted thereon, a bar mounted on said sand-board, a channel bar mounted on said last named bar having its side flanges extending upwardly, a leaf bow-spring having its ends extending outwardly and downwardly and resting upon and slidably carried on said channel bar adjacent to its outer ends, and a vehicle body carried on said spring intermediate of its ends, substantially as described.

WILLIAM T. SHAVER.

Witnesses:
 JESSIE MOORMAN,
 M. WALLACE.

Copies of this patent may be obtained for five cents each, by addressing the "Commissioner of Patents, Washington, D. C."